April 6, 1943.   R. D. EVANS ET AL   2,315,606
ELECTRICAL SYSTEM
Filed May 31, 1939   5 Sheets-Sheet 1
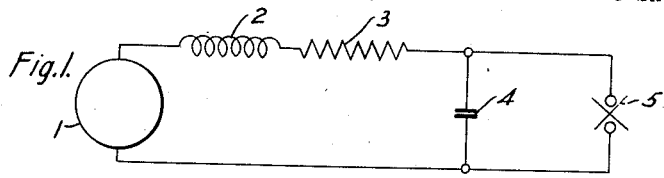
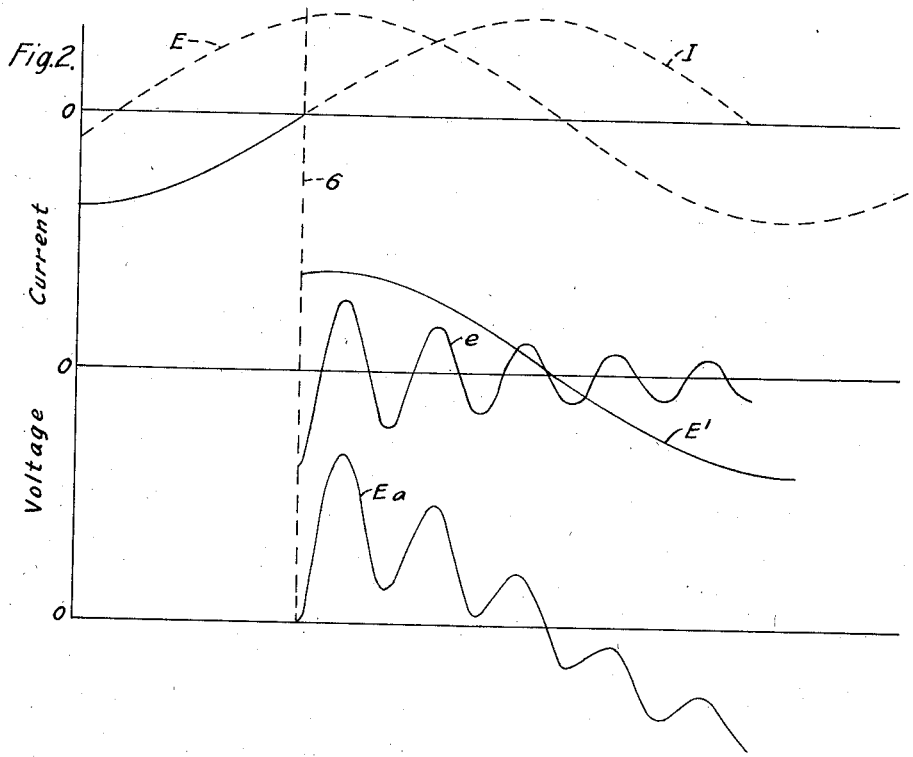
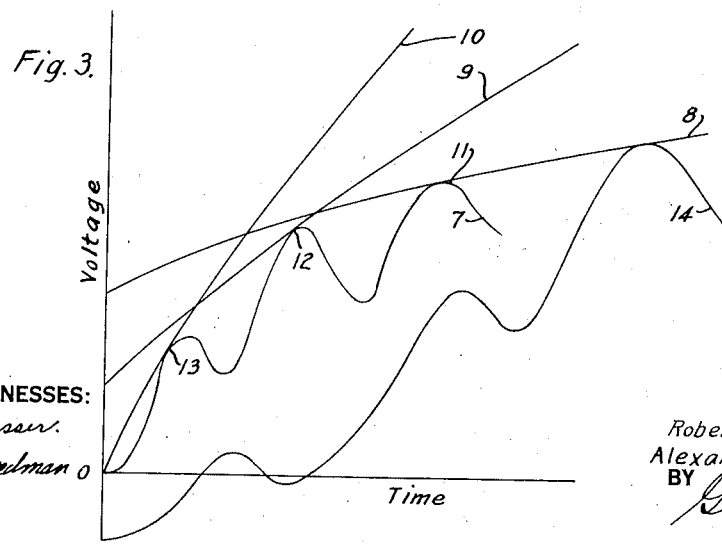
WITNESSES:
INVENTORS
Robert D. Evans and
Alexander C. Monteith.
BY
ATTORNEY

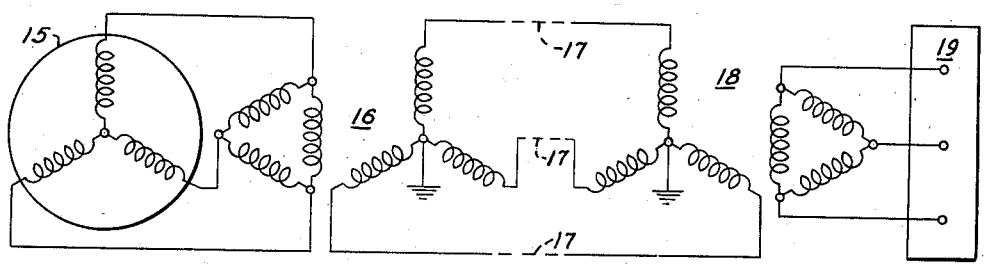
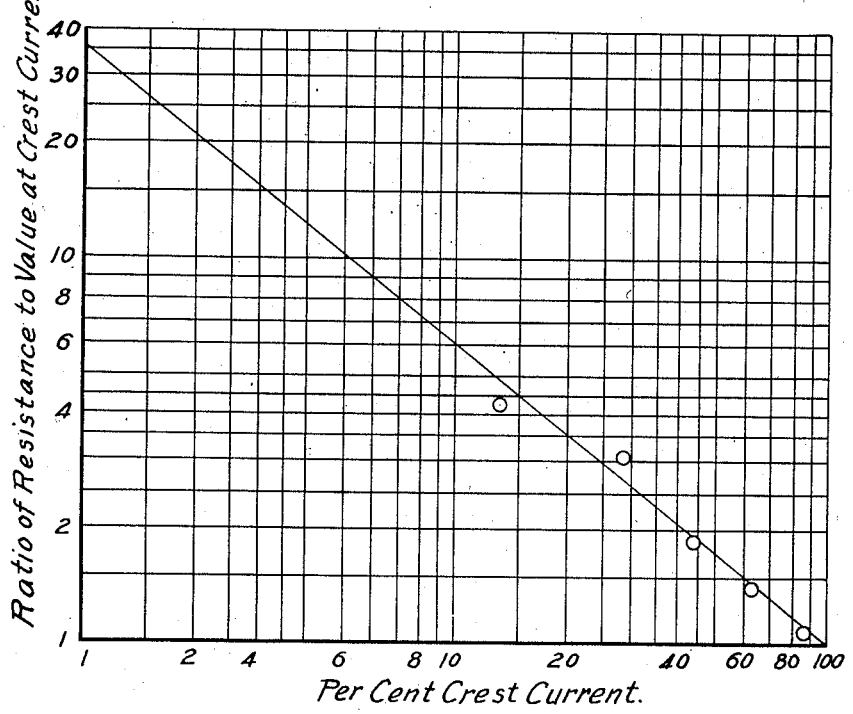

April 6, 1943. R. D. EVANS ET AL 2,315,606
ELECTRICAL SYSTEM
Filed May 31, 1939 5 Sheets-Sheet 3
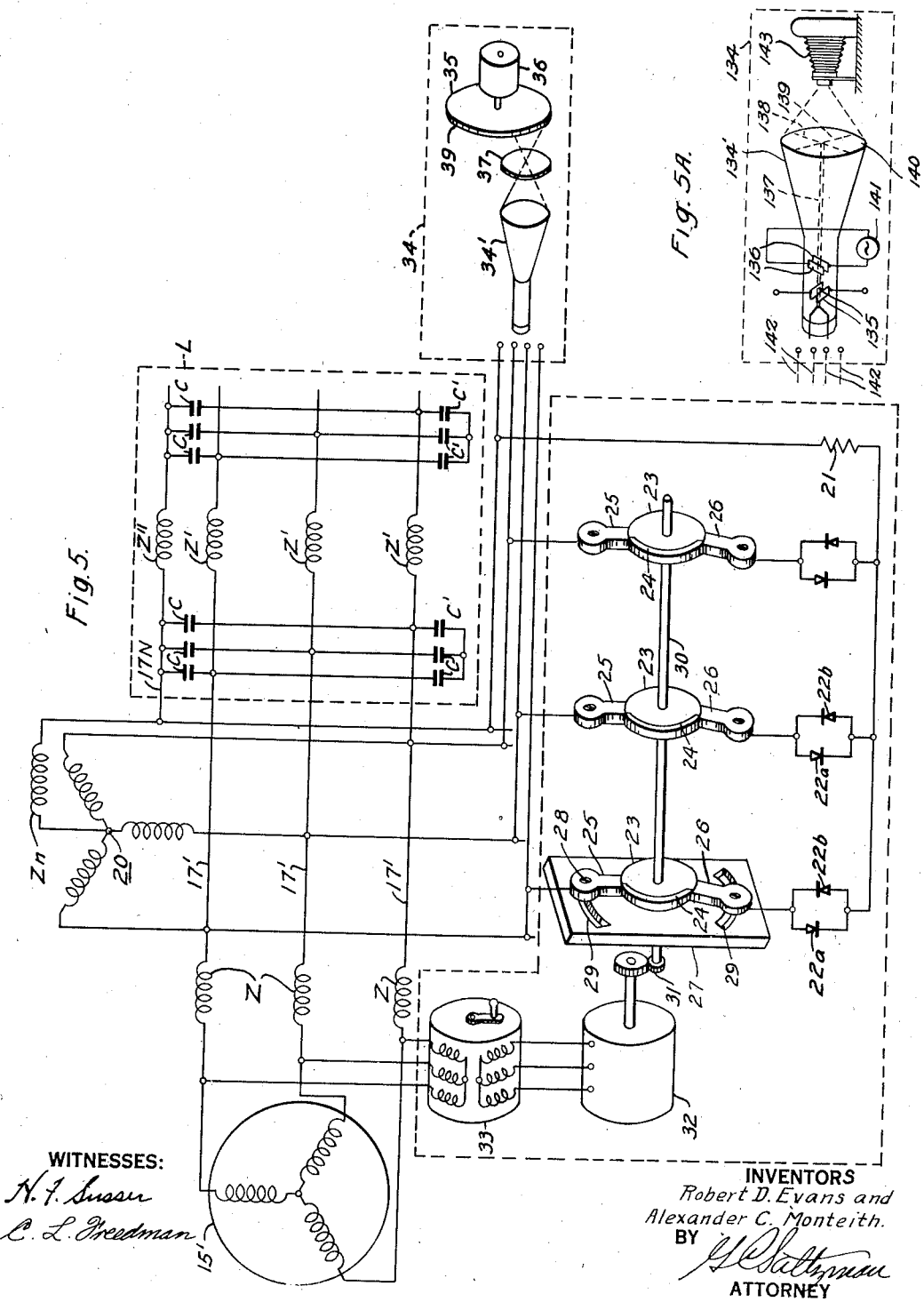
WITNESSES:
INVENTORS
Robert D. Evans and
Alexander C. Monteith.
BY
ATTORNEY April 6, 1943.  R. D. EVANS ET AL  2,315,606
ELECTRICAL SYSTEM
Filed May 31, 1939  5 Sheets-Sheet 4
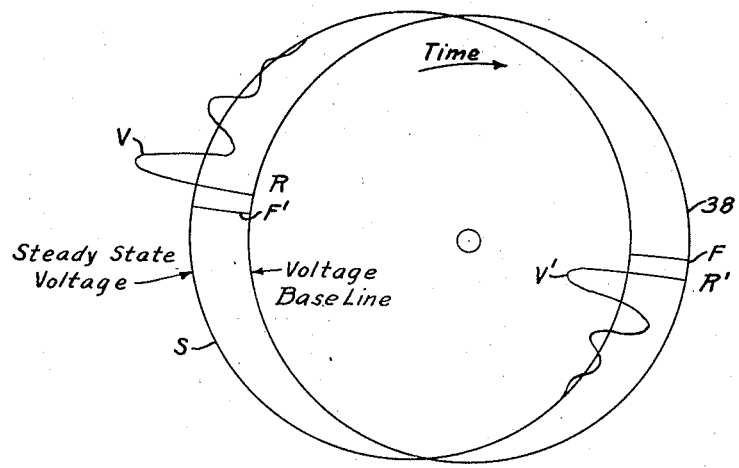
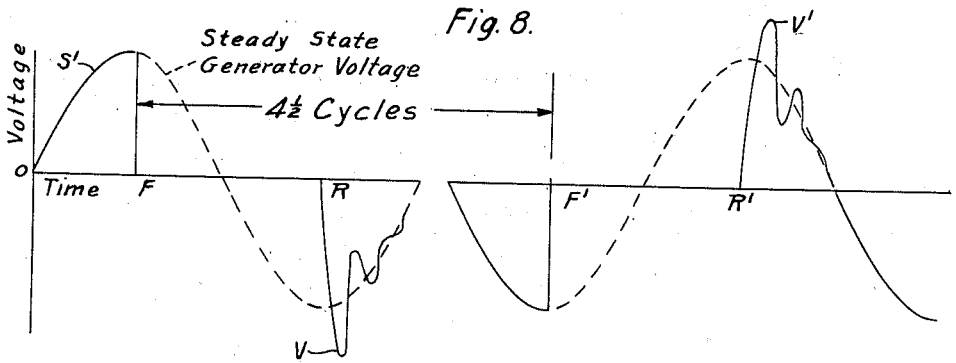
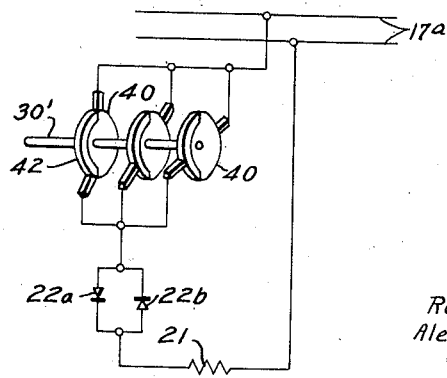
WITNESSES:
N. F. Susser,
C. L. Freedman
INVENTORS
Robert D. Evans and
Alexander C. Montieth.
BY
ATTORNEY Patented Apr. 6, 1943

2,315,606

UNITED STATES PATENT OFFICE 2,315,606

ELECTRICAL SYSTEM

Robert D. Evans, Swissvale, and Alexander C. Monteith, Wilkinsburg, Pa., assignors to Westinghouse Electric & Manufacturing Company, East Pittsburgh, Pa., a corporation of Pennsylvania Application May 31, 1939, Serial No. 276,622

17 Claims. (Cl. 234—1.5)

This invention relates to miniature systems for representing electrical circuits, and it has particular relation to systems and methods for determining the effects of a temporary circuit disturbance on an electrical characteristic of a circuit.

It is, of course, possible to measure directly a steady-state characteristic of an electrical circuit with ordinary measuring instruments. But when the characteristic to be measured is dependent on a temporary circuit disturbance occurring at random periods, it is extremely difficult to ascertain by field data or analytical methods. As a specific example, reference may be made to the occurrence of a fault on an electrical system. When the fault is cleared, a recovery voltage appears on the system which includes a steady-state voltage modified by a transient voltage resulting from the fault. If the system is simple, the recovery voltage may be determined by analytical methods, but such methods when applied to complicated systems are extremely laborious and impractical. Among these analytical methods, that employing the principles of symmetrical components is particularly helpful, but even this involves prolonged and tedious effort in solving the problems of complicated electrical circuits.

In accordance with our invention, when the effects of a temporary modification of a circuit are to be studied, an equivalent miniature circuit is prepared. Conveniently, the circuit may be set up on an electrical calculating board. This equivalent circuit then is modified in accordance with the modifications of the actual circuit which is to be studied. Thus, when the effects of a temporary fault on the circuit are to be determined, an equivalent fault is applied to the circuit set up on the calculating board and the desired measurements of electrical characteristics of the circuit are directly made. Some advantages offered by our invention are set forth in articles published in Electrical Engineering, vol. 56, June, 1937, pages 695 to 703, and vol. 57, August, 1938, page 433.

It is, therefore, an object of our invention to determine directly the effects of a temporary circuit modification on an electrical characteristic of the circuit.

It is a further object of our invention to provide apparatus for determining the effects of a de-energizing electrical transient on an electrical circuit.

It is a further object of our invention to provide a system for determining the recovery characteristics of an electrical circuit following the application thereto of a temporary fault.

It is a still further object of our invention to provide apparatus for determining the effects of a recurring electrical phenomenon on an electrical circuit.

It is another object of our invention to provide apparatus for determining the effects of an energizing electrical transient on an electrical circuit.

It is another object of our invention to provide apparatus for simulating the electrical characteristics of a fault.

It is another object of our invention to provide a method for determining the effect of disturbances on an electrical circuit.

Other objects of our invention will be apparent from the following description taken in conjunction with the accompanying drawings, in which:

Figure 1 is a diagrammatic view of an electrical circuit subject to a fault condition;

Fig. 2 is a graphic representation of the electrical characteristics of the circuit shown in Fig. 1 following the occurrence of a fault therein;

Fig. 3 is a graphic representation of typical voltage recovery curves and insulation recovery curves;

Fig. 4 is a diagrammatic view of a typical electrical transmission circuit;

Fig. 5 is a diagrammatic view, with parts in perspective, of an equivalent miniature circuit corresponding to the circuit of Fig. 4, having circuit modifying apparatus and measuring apparatus associated therewith;

Fig. 5A is a schematic view showing modified measuring apparatus suitable for the circuit of Fig. 5.

Fig. 6 is a graphic view showing the characteristics of an arc representation device compared to the characteristics of an actual arc;

Figs. 7 and 8 are representative graphic views of records made in accordance with our invention;

Fig. 9 is a diagrammatic view with parts in perspective of an alternative circuit modifying device;

Figure 10:
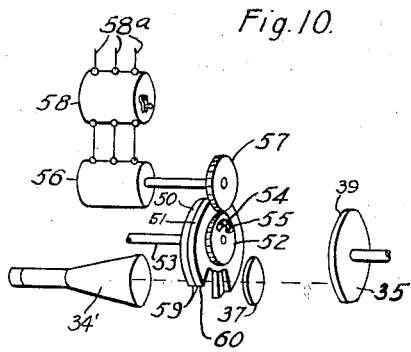
Fig. 10 is a view in perspective of a recording unit suitable for employment with our invention.

Referring to the drawings, the general problems to be studied may be set forth with reference to a simplified circuit illustrated in Fig. 1. This circuit is representative of a simplified transmission circuit having a generator 1 transmitting electrical energy through a circuit including an inductance 2 and a resistance 3. Across the circuit a condenser 4 may be connected. The inductance 2, resistance 3 and condenser 4 may represent the distributed inductance, resistance and capacitance of a transmission circuit. If a fault 5 is applied to the circuit of Fig. 1, the voltage across the fault path departs for the duration of the fault from the steady-state voltage supplied by the generator 1. The voltage across the fault immediately after the clearance of the fault may be analyzed with reference to Fig. 2.

In Fig. 2 a voltage curve E and a current curve I represent by ordinates the steady-state alternating voltage and current of the circuit of Fig. 1, abscissae representing time. If a fault 5 occurs in the circuit of Fig. 1, the fault ordinarily will clear at a current zero represented by the dotted ordinate 6. Following this current interruption, the voltage appearing across the point of fault 5 will be made up of two components, one, a voltage E' corresponding to the steady-state voltage E. The second component represents the voltage $e$ appearing as the result of the oscillation characteristics of the circuit of Fig. 1. That is, the voltage $e$ is determined by the characteristics of the circuit of Fig. 1 for free oscillation. Because of the losses present in the circuit, this voltage will have a decrement or decay dependent upon the magnitude of the losses. The resultant voltage appearing across the fault 5 after the clearance of the fault is the sum of the two voltages E' and $e$, and is represented by a curve $E_a$ in Fig. 2. It will be noted that the resultant voltage may be considerably in excess of the steady-state voltage, and the insulation characteristics of the circuit of Fig. 1 must be such that no insulation breaks down under the influence of this excess voltage.

With a circuit as simple as that shown in Fig. 1, the resultant recovery voltage $E_a$ may be determined by analytical methods without great difficulty. For more complex circuits, however, such analytical methods would prove very burdensome.

The recovery characteristics of a more complicated circuit are illustrated in Fig. 3, wherein ordinates represent voltage, and abscissae represent time from fault clearance. In Fig. 3, a recovery voltage characteristic 7 is illustrated as starting from zero voltage and rising with a series of peaks to a maximum voltage. The relationship of this voltage to the insulation characteristics may be illustrated by plotting a series of typical insulation recovery curves 8, 9 and 10. It will be observed that the insulation recovery curve 8 starts at a high voltage and increases very gradually. A second insulation recovery voltage curve 10 starts at zero and increases very rapidly, and a third insulation voltage recovery curve 9 starts at an intermediate value of voltage and increases at an intermediate rate. It will be observed that for the insulation recovery curve 8, the critical voltage following the clearance of the fault is that represented by the peak 11 of the voltage recovery curve 7. For the insulation recovery curve 9, the critical point is the peak 12, and for the curve 10, the critical point is the peak 13. Consequently, a determination of the recovery voltage curve 7 is important in assuring satisfactory performance of the insulation at any point of possible fault. A second recovery voltage curve 14 is illustrated in Fig. 3 in order to show the appearance of a curve in which a residual charge remains on the electrical circuit at the time of fault clearance.

In Fig. 4, we have illustrated a typical transmission circuit which includes a generator 15, a step-up transformer 16, a transmission line 17, a step-down transformer 18 and a load 19. The transformers are illustrated as delta-star and star-delta, respectively, with the star windings grounded.

In order to determine the recovery voltage characteristics of this typical transmission circuit, we set up an equivalent miniature circuit conveniently on an electrical calculating board. Such boards are well known in the art, a typical board being described in an article by H. A. Travers and W. W. Parker appearing in the Electric Journal for May, 1930, pages 266-270. As is well known in the art, the equivalent circuit may take a number of forms. If desired, the circuit of Fig. 4 may be represented by three single-phase circuits corresponding to the positive-sequence, negative-sequence and zero-sequence circuits obtained by the well known principles of symmetrical components. Alternatively, the circuit of Fig. 4 may be represented by an equivalent polyphase circuit and ordinarily the polyphase circuit is to be preferred. The latter circuit has been adopted in Fig. 5.

Referring to Fig. 5, a polyphase circuit is illustrated which is equivalent to the circuit of Fig. 4. In Fig. 5 a source which may be a generator 15', supplies electrical energy to three conductors 17' of a polyphase circuit. These three conductors each includes an impedance Z which corresponds to the positive or negative sequence impedance per phase of the generator 15 and transformer 16. Ordinarily the system impedances are laid out so that the source impedance is negligible in comparison with the impedances of the remaining branches of the system. If the impedance of the source 15' is material, allowances therefor should be made in computing the value of the impedance Z. A neutral conductor 17N is energized from the conductor 17' through a star-connected impedance 20 and a neutral impedance $Z_n$, which is equal to ⅓ of the zero-sequence impedance of the transformer.

The transmission line itself may be represented by equivalent π or T sections. In Fig. 5 the transmission line of Fig. 4 is represented by an equivalent π section L. In this π, each of the polyphase conductors is provided with an impedance Z' which is equal to the positive or negative-sequence series impedance of the transmission line, and the neutral 17N is provided with an impedance Z'' which is equal to ⅓ of the difference between the zero sequence impedance of the transformer and Z'. Each end of the π is provided with two groups of condensers C and C'. Each condenser C has a capacitance equal to the zero-sequence capacitance for each phase of the transmission line shown in Fig. 4, and each condenser C' has a capacitance equal to the difference between the positive or negative sequence capacitance and the zero-sequence capacitance for each phase of the transmission circuit of Fig. 4. Although only one symmetrical π section is shown in Fig. 5, it is to be understood that as many symmetrical or unsymmetrical π sections may be employed as is found desirable. If desired, a load may be applied to the circuit shown in Fig. 5.

Actual fault conditions occurring on the circuit of Fig. 4 are simulated for the circuit of Fig. 5 by applying thereto representative faults corresponding to the actual faults occurring on the circuit of Fig. 4. This may be accomplished by connecting to the circuit of Fig. 5 a fault representation device including an impedance which has characteristics similar to the fault impedance applied to the circuit of Fig. 4. For example, the equivalent fault impedance may include an impedance or resistance 21 for representing the resistance of tower footings in the event that the fault occurs at a tower of the transmission line. If the fault includes an arc, such as that of a flashover protector, as is usually the case, it also becomes necessary to provide an equivalent arc impedance in the fault representation device of Fig. 5. Since the arc impedance is not constant but varies inversely with current, the arc representation device cannot be a simple impedance. If desired, the arc may be simulated by employing a commutator rotated in synchronism with the voltage applied to the equivalent circuit, each segment of the commutator being connected to a different resistance which represents the resistance of the arc at a particular time relative to the applied voltage. However, a simple arc representation device is available in the contact type of rectifier such as the copper-oxide disc rectifier. The copper-oxide disc rectifier has a variation in resistance relative to current which corresponds very closely to the actual resistance of an arc relative to the current flowing therethrough.

This close resemblance has been illustrated in Fig. 6, wherein abscissae represent percent of crest current flowing through the contact rectifier or arc, and ordinates represent the ratio of resistance to the value of resistance at crest current for the contact rectifier or arc. In Fig. 6, the full line curve represents the impedance characteristics of a flashover protector of a well known type commonly called a "De-ion" protector, and the circles represent the impedance characteristic of a contact rectifier of the copper-oxide disc type. It will be observed that the impedance characteristics of the two units are extremely similar.

One of the characteristics of the impedance of an arc is its rapid increase adjacent the point of clearance or current zero. In order to simulate this more accurately with the copper-oxide disc type of arc-simulating device, it may be desirable to open or clear the fault applied to the equivalent circuit slightly ahead of a current zero in order to leave a charge on the system.

Since the copper-oxide disc rectifier ordinarily is conductive in only one direction, a pair of rectifiers 22a, 22b is employed for each phase to be faulted. The rectifiers of each pair are connected as illustrated, to permit the flow of current in either direction through each phase to be faulted.

In order to time the point of application of the fault to the equivalent circuit and the duration of the fault, we provide a plurality of rotating commutators 23 each having a conducting segment 24 extending around a portion of the periphery thereof. Each of the commutators has a pair of brushes 25 and 26 mounted in contact therewith, and these brushes are adjustably positioned on a supporting member 27 (only one of which is illustrated). The adjustment of the brushes relative to the supporting member may be effected in any desired manner. As illustrated, each brush is secured by a screw 28 which passes through a slot 29 formed in the supporting member. By loosening the screw, the brush may be moved relative to the supporting member and reattached at any desired position. The commutators are carried on a common shaft 30, which is rotated through a gear train 31 by means of a synchronous motor 32. This synchronous motor is energized from the source 15' through a phase shifter 33, which may be adjusted for varying the point of application of the fault relative to the voltage supplied by the generator 15'.

Although a single application and clearance of a fault would be sufficient to simulate a single actual fault on the transmission system of Fig. 4, for measuring purposes, it is desirable to apply and clear the fault a number of times. For this reason, the commutators 23 are employed for connecting and disconnecting the fault from the equivalent circuit of Fig. 5 as many times as desired. The duration of the fault is controlled by the positions of each pair of brushes 25 and 26. As soon as both brushes contact their segment 24, a fault is applied to the equivalent circuit. When one of the brushes leaves the segment 24, the fault is cleared.

If the faults were applied only on a positive portion of the voltage cycle, or only on a negative portion of the voltage cycle, some trouble from cumulative magnetization of iron in the equivalent circuit, such as that present in the generator 15' may be experienced because of the action of each transient following the clearance of the fault. In order to prevent any possible magnetization, we prefer to select the gear ratio of the gear train 31 so that the fault is applied alternately on a positive portion of the voltage cycle and on a corresponding negative portion of the voltage cycle. Because of this alternation, no trouble will be encountered from magnetization.

For effectively measuring a characteristic of the circuit following the application and clearance of a fault, it is desirable to employ a measuring device capable of following each variation of the characteristic to be measured. For this purpose, we prefer to employ a cathode-ray oscillograph 34, which is illustrated generally in Fig. 5. Although the cathode-ray oscillograph may be employed for producing its own time displacement which may be photographed in the customary manner, we prefer to employ only one pair of deflecting plates or coils for deflecting the characteristic to be measured. A record of this deflection then is produced on a photographic film 39 carried by a disc 35, which is rotated in synchronism with the frequency of the source 15' by means of a synchronous motor 36. As illustrated, the axis of the disc 35 is displaced from the axis of the oscillograph tube 34' and the screen of the oscillograph tube is focused on the photographic film carried by the disc through a lens system 37. The deflection of the cathode-ray beam is on a line which intersects the axis of the disc 35. Consequently, as the disc rotates and records a measurement, the record produced will be of the polar type. A typical record obtained from the measuring device illustrated in Fig. 5 is shown in Fig. 7.

As shown in Fig. 7, when the trace of the cathode-ray tube is at rest, a reference circle 38 is traced on a recording surface provided by the photographic film 39. Under normal operating conditions a circle S representing a sine wave of voltage is recorded. When a fault occurs, as at a point F, the recording surface continues rotation until the point of fault clearance, which in this case is illustrated as occurring at a point R approximately a half-cycle later. At this point R, a recovery voltage V is produced which on dissipation of the transient voltage merges into the steady-state voltage. It will be observed that the particular transient recovery voltage illustrated is highly damped. The recording surface continues rotation until the next point of fault application, which as above noted, occurs alternately on positive and negative portions of the voltage wave. For example, the next fault application may occur 4½ cycles later at a point F', and the fault continues until it is cleared, approximately ½ cycle later, at the point R'. At the point R' a second transient recovery voltage V' is recorded on the recording surface. This sequence repeats every nine cycles, successive measurement overlying those initially made on the photographic chart with a resulting improved clarity of the record. The various curves of Fig. 7 are shown also in Fig. 8, plotted on Cartesian coordinates.

As shown in Fig. 8, the normal steady-state voltage of the system is represented by a sine curve S'. The points F, R, F' and R' correspond to those shown in Fig. 7.

Approximately one-half cycle elapses between the time of fault application F and the time of fault clearance R in Fig. 7. The amount of elapsed time is optional, and may vary appreciably from that illustrated.

In Fig. 7 the voltage following fault clearance is highly damped. Consequently, the voltage waves V and V' do not overlap. If the voltage waves are not appreciably damped, they may continue until overlapping occurs. Ordinarily, this will not be to an extent sufficient to render analysis difficult. If desired, however, a commutator rotating synchronously with the disc 35 may be included in the oscillograph unit for interrupting the circuit of the cathode-ray tube except for the interval to be studied. That is, only the portion of the recovery voltage to be studied need be recorded.

Referring to Fig. 10 a representative device is illustrated for restricting the record of Fig. 7 to any desired fraction of a complete record. For this purpose, a shutter device is interposed between the cathode ray tube 34' and the record holder 35. The shutter device comprises a pair of shutter disks 50, 51 which are mounted for rotation with a gear 52 on a shaft 53. Adjustments of the disks relative to each other or to the gear may be provided in any desired manner as by attaching these elements by a machine screw 54 which passes through an arcuate slot 55 in the gear and similar slots in the disks. Rotation of the disks is effected by a synchronous motor 56 having a shaft provided with a gear 57 for engaging the gear 52. The motor may be energized through a phase shifter 58 from the power source 15' of Fig. 5, as through suitable conductors 58a.

The shutter disks 50, 51 are provided with slots 59, 60 for permitting exposure of the cathode ray tube screen to a light sensitive chart carried by the record holder 35 over a predetermined interval. These slots have widths measured radially from the shaft 53 sufficient to pass the complete image of the cathode ray tube and have angular lengths measured around the shaft 53 sufficient for passing an image for the time interval to be studied. The resultant angular length of the slots may be varied by moving one of the disks relative to the other disk. The interval to be studied may be shifted by moving both disks relative to the gear 52 or by adjusting the phase shifter.

It will be understood that the gears are selected for rotating the disks in synchronism with the cycle to be studied. During each rotation of the disks only that portion of the cycle to be studied is exposed through the slots 59, 60. For example, if it is desired to study only the recovery voltages V and V' of Figs. 7 and 8, the disks may be rotated once for each four and one-half cycles of the fundamental voltage. The resultant length of the slots 59, 60 is adjusted to expose the cathode ray tube screen for a time interval corresponding to that required for each recovery voltage V or V', and the slots are so positioned relative to the gear 52, and the phase shifter is so adjusted, that the slots expose the cathode ray tube screen only while the recovery voltages V or V' are being traced thereon.

The procedure to be followed in determining the recovery voltage of a system is believed clear from the foregoing description. The transmission circuit or other circuit to be studied is set up in equivalent miniature form as illustrated in Fig. 5, with the various inductances and capacitances selected to produce in the equivalent circuit results analogous to those produced in the actual circuit. Continuing the conversion to equivalents, the resistance 21 and fault simulating devices 22 and 22b are selected to correspond to the actual fault impedance to be encountered in the actual system under study. The brushes 25 and 26 are then adjusted to produce a fault of the desired duration and the relation of the brushes to the commutators 23 is selected to produce the fault at the desired point with reference to the applied voltage. Ordinarily, the time of application of the fault may be the same for all phases and the point of application of the fault may be adjusted by means of the phase-shifter 33.

The adjustment of the time of fault application may be checked by inspection of the voltage wave alone as a rule, although if desired, an oscillograph may be connected across a resistance in the fault circuit for measuring the voltage drop across the resistance in order to determine accurately the proper time of fault application. Because of the high resistance of the commutator insulation, a fault may be cleared before or after a current zero. Ordinarily, this will be accompanied by sparking, however, of the commutator segments, and this sparking itself is an indication that the fault is not being cleared at a current zero.

A further check on the adjustment of the apparatus shown in Fig. 5 may be provided by mounting the oscillograph tube 34' so that it may be moved for direct inspection of the oscillograph screen. This will enable ready adjustments in the amplitude of movement of the oscillograph cathode beam and in its focusing. Moreover, if desired, both deflecting circuits of the oscillograph tube 34' may be employed for direct visual inspection of the voltage wave on the cathode-ray screen, and the wave so produced may be photographed directly. A conventional oscillograph 134, wherein both deflecting circuits are employed, is illustrated in Fig. 5A.

Referring to Fig. 5A, the oscillograph 134 includes a conventional cathode ray oscillograph tube 134'. This tube is provided with two pairs of deflecting plates 135 and 136 for controlling the deflection of an electron beam 137 represented in broken lines. The pairs of deflecting plates 135 and 136 have surfaces extending respectively at right angles to each other. The pair of deflecting plates 135 operates to deflect the electron beam 137 along a line 138. The pair of deflecting plates 136 operates to deflect the beam 137 along a line 139 which extends at right angles to the line 138. In accordance with standard practice, the electron beam 137 moves over a fluorescent screen 140 which forms the end of the tube 134'. As well understood in the art, the impact of the electron beam on the fluorescent screen produces a spot of light.

The pair of deflecting plates 136 may be energized from a standard sweep circuit generator 141. This generator serves to apply across the pair of deflecting plates 136 a voltage of sawtooth formation. This voltage is such that the electron beam 137 is urged at a substantially uniform rate in one direction along the line 139 relatively slowly, and is returned rapidly to its starting point at the end of the sweep interval. The generator 141 may be adjustable to permit synchronizing of the rate of sweep of the electron beam 137 with respect to the phenomenon to be studied by the oscillograph.

The pair of deflecting plates 135 may be connected for energization in accordance with any desired characteristic—for example, conductors 142 for energizing the pair of deflecting plates 135 may represent connections to the circuit shown in Fig. 5. As well understood in the art, the operation of the tube 134' produces on the fluorescent screen 140 a two-dimensional luminescent curve which may be inspected visually. The luminescent curve also has sufficient brightness to permit direct photography thereof. To this end, a conventional camera 143 may be positioned at a suitable distance from the fluorescent screen 140. Further details of the construction and operation of the oscillograph 134 and the procedure for photographing a curve traced on the fluorescent screen 140 may be found by reference to various publications on oscillographs, such as the book entitled "The Cathode Ray Tube At Work", by J. F. Rider, published in 1935 by J. F. Rider, New York city.

Although voltage characteristics ordinarily will be those studied in connection with circuit disturbances, such as those produced by faults, it is possible with our apparatus to study other characteristics, such as current behavior or phase displacement occasioned by the application of circuit disturbances to an equivalent circuit. These characteristics may be studied at any point in the circuit. For example, the cathode ray oscillograph may be connected to measure line-to-line voltage of the equivalent circuit at the generator end, the load end or some intermediate point of the system. For measuring a current, a resistance may be included in the conductor carrying the current to be measured. The voltage drop across the resistance may be amplified and supplied to the oscillograph 34 for measurement.

In some cases, it may be desirable to represent a restriking of an arc by means of the apparatus shown in Fig. 5. This may be accomplished readily by employing the modification shown in Fig. 9, wherein a plurality of commutators 40 similar to those heretofore described, are mounted on a common shaft 30' which may correspond to the shaft 30 of Fig. 5. Each of these commutators is provided with a pair of brushes, and it will be noted that the brushes of the various commutators are mounted in different positions relative to the commutator segments 42. Consequently, as the commutators rotate, the pairs of brushes are consecutively short-circuited by their respective commutator segments, and consecutively establish a connecting path for the arc representation device 22a, 22b across conductors 17a of the circuit being studied. Although the modification of Fig. 9 is shown for only one phase, it is obvious that a similar arrangement may be employed for each phase of a polyphase circuit. In practicing our invention a fault may be applied from one or more lines to ground or neutral, or it may be applied between lines of the circuit being studied.

Our invention is applicable to the study of many circuit conditions other than those specifically referred to hereinbefore. For example, instead of creating a deenergizing transient such as that produced by the circuit of Fig. 5, an energizing transient may be created. A typical arrangement for this purpose is illustrated in Fig. 11 as applied to the miniature circuit of Fig. 5.

Figure 11:
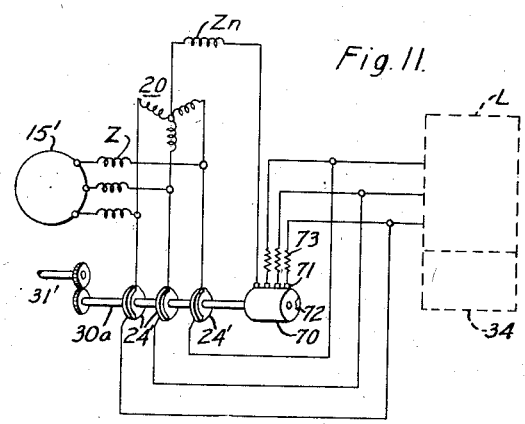
Fig. 11 is a diagrammatic view with parts in perspective of circuit modifying apparatus for applying energizing transients to a miniature electrical system.

In Fig. 11, the generator 15', impedances 20, Z and $Zn$, equivalent transmission line L and oscillograph 34 all correspond to the same elements in Fig. 5. However, the equivalent transmission line L now is connected to the generator 15' through a plurality of commutators 24' similar to those 24 of Fig. 5. These commutators 24' are mounted on a shaft 30a which may be driven through a gear train 31' from the motor 32 of Fig. 5.

It will be noted that the commutators 24' periodically connect and disconnect the equivalent transmission circuit L to and from the generator 15'. The duration and time of application of each connection and disconnection may be adjusted as desired by means of the phase shifter and by moving the commutator brushes as explained in describing the commutators 24 of Fig. 5. The oscillograph may be connected between a phase conductor and neutral for measuring the transient phase-to-neutral voltage, or it may be connected otherwise to furnish any desired measurement.

The operation of the circuit of Fig. 11 is exactly the same as that of Fig. 5 except that the transients now measured are produced by periodically energizing the equivalent circuit instead of periodically faulting the equivalent circuit.

Figure 12:
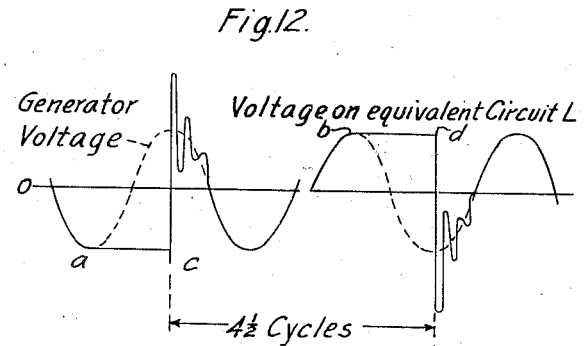
Fig. 12 is a graphical view plotted in Cartesian coordinates of a voltage curve obtained with the apparatus of Fig. 11.

When the commutators 24' connect the equivalent circuit L to the source 15', the resulting transient depends on the charge remaining on the circuit. Referring to Fig. 12, a specific curve is shown in which a phase-to-neutral voltage (ordinates) is plotted against time (abscissae). The commutators 24' are adjusted to disconnect the equivalent transmission circuit L from the generator at points $a$ and $b$ which define voltage crests four and one-half cycles apart. The commutators 24' are adjusted further to connect the equivalent transmission circuit L to the generator at points $c$ and $d$ which are one-half cycle respectively behind the points $a$ and $b$. In the interval between the points $a$ and $c$ the equivalent transmission circuit retains a charge corresponding to the ordinate at the point $a$. This ordinate has such a polarity that it adds to the voltage applied to the equivalent transmission circuit at the point $c$ to produce a large transient. By varying the points of connection and disconnection other transient possibilities may be simulated.

Under some conditions it may be desirable to remove the charge from the equivalent transmission circuit L prior to each connection thereof to the generator. For this purpose, an additional commutator 70 is mounted on the shaft 30a. Four brushes 71 are positioned on the commutator and these brushes are connected respectively to the phase and neutral conductors of the equivalent transmission circuit. Once during each revolution of the commutator, these brushes are connected through a conducting segment 72 carried by the commutator for discharging the equivalent transmission circuit. The brushes may be mounted for adjustment around the commutator in the manner illustrated in Fig. 5 for the brushes 25. If desired, impedance 73, which may be resistances, are included in the connections to the brushes 71 for controlling the discharge currents. For some studies, the commutator 70 may be omitted and the impedances 73 connected permanently between the conductors.

In the circuits described above, dry disc rectifiers are employed to provide discharge paths having properties similar to those of the arc discharges occurring on power lines. Other devices having similar properties may be employed instead of the dry disc rectifiers to simulate arc characteristics such as those encountered in protector tubes. For example, gaseous discharge tubes are suitable for this purpose, and a circuit employing such tubes is illustrated in Fig. 13.

Figure 13:
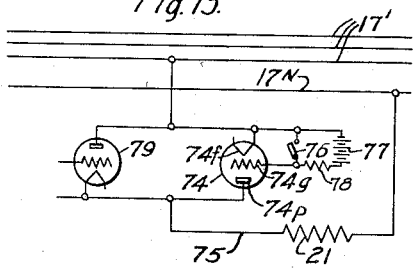
Fig. 13 is a diagrammatic view of a modified fault representation unit embodying our invention.

Referring to Fig. 13, we have illustrated a portion of the polyphase circuit represented by the conductors 17' of Fig. 5. In order to establish a fault on one of these conductors, a gaseous discharge tube 74 may be connected in this circuit at the point to be faulted. Various gaseous discharge tubes are suitable for this purpose but in the specific embodiment illustrated, a grid-controlled, gaseous discharge tube of the type commonly referred to under the trade names Grid-Glow and Thyratron is employed. The tube 74 has its filament or cathode 74f connected to one of the conductors 17' of the polyphase circuit, and it has its plate 74p connected through a conductor 75 to the neutral conductor of the polyphase circuit. In order to represent the tower footing impedance described above, the impedance 21 may be included in the conductor 75. To render the tube 74 conductive and non-conductive, at the proper intervals, an intermittently operated switch 76 is provided for varying the bias on the grid of the tube 74. This switch may be of the rotary commutator type illustrated in Figs. 5 and 9. If the tube 74 is of the "positive grid type," it follows that the switch 76 must periodically apply a positive biasing voltage to the grid in order to render the gaseous discharge tube 74 conductive. For the purpose of illustration, however, we have shown a gaseous discharge tube of the "negative grid type" in which a negative grid bias must be applied in order to prevent discharge of the tube. This bias may be applied from any suitable voltage source, a battery 77 being illustrated for this purpose. At predetermined intervals, the switch 76 closes to connect the grid 74g directly to the filament 74f in order to render the tube 74 conductive. A resistance 78 may be provided for restricting the flow of current from the battery 77 when the switch 76 is closed.

It is believed that the operation of the modification shown in Fig. 13 is apparent. Normally, the bias on the tube 74 is negative so that no discharge occurs between the filament and plate of the tube. At predetermined intervals the switch 76 closes to remove the biasing voltage applied to the grid 74g, and at these intervals, the tube breaks down to pass current between its filament and plate. The timing of the switch 76 may be similar to that of the switches shown in Figs. 5 and 9. That is, the timing may be such that the tube breaks down every four and one-half cycles, referring to the frequency of the energy supplied to the conductors 17'. The adjustment of the switch 76 may be by means of a phase shifter or by means of brush adjustments as described with reference to the commutators 23 of Fig. 5. The effect of the recurrent faults produced by the tube 74 may be measured by an oscillograph in the same manner described with respect to Fig. 5.

It will be noted that the tube 74, if unilaterally conductive, would pass current in only one direction between the points to be faulted. In order to provide for the passage of current in either direction between these two points, a second tube 79 may be employed which is similar in construction to the tube 74. As illustrated in Fig. 13, the tube 79 has its plate and filament connected between the points to be faulted in a reverse manner as compared to the tube 74. That is, the plate of the tube 79 and the filament of the tube 74 are connected to one of the conductors 17' whereas the filament of the tube 79 and the plate of the tube 74 are connected to the conductor 75. The grid of the tube 79 may be controlled in exactly the same manner as the grid 74g of the tube 74. With the circuit illustrated in Fig. 13, whenever the switch 76 operates, current is passed between the points to be faulted in both directions. If the particular phenomenon to be studied requires only a uni-lateral conduction, it is obvious that one of the tubes may be omitted.

The construction shown in Fig. 13 is effective for only one phase conductor 17'. However, it is to be understood that a similar unit may be applied to each of the conductors 17' if a two or three-phase fault is to be simulated.

Although we have described our invention with reference to certain specific embodiments thereof, it is obvious that numerous modifications thereof are possible. Therefore, we do not wish our invention to be restricted except as required by the appended claims when interpreted in view of the prior art.

We claim as our invention:

1. In a device for applying intermittent artificial faults to an electrical circuit, a fault application device comprising a plurality of commutators, motive means for rotating said commutators in synchronism, a plurality of brushes for said commutators, impedance means having an impedance which varies inversely with current, and circuit connections for connecting said brushes and impedance means to render said commutators rotating switches for said impedance means.

2. In an electrical system, a source of alternating voltage, an electrical circuit energized from said source, means for temporarily modifying said circuit at a predetermined point on a positive portion of the alternating voltage, and for similarly modifying said circuit at a corresponding point on a negative portion of the alternating voltage, and means for showing the effect of said modifications on an electrical characteristic of said circuit.

3. In an electrical system, a source of alternating voltage, an electrical circuit energized from said source, means for applying temporary modifications to said circuit at a similar point on each of a plurality of positive half-cycles of said alternating voltage, and for applying similar modifications to said circuit at a similar point on each of a plurality of negative half-cycles of said alternating voltage, and means for visibly representing the effect of said modifications on an electrical characteristic of said circuit.

4. In an electrical system, a source of alternating voltage, an electrical circuit energized from said source, means for applying temporary modifications to said circuit at a similar point on each of a plurality of positive half-cycles of said alternating voltage, and for applying similar modifications to said circuit at a similar point on each of a plurality of negative half-cycles of said alternating voltage alternating with said positive half-cycles, and means for indicating the effect of said modifications on an electrical characteristic of said circuit, said indicating means including means for superimposing the indications corresponding to said positive half-cycles, and for separately superimposing the indications corresponding to said negative half-cycles.

5. The method for determining the characteristics of an electrical system energized from a source of alternating voltage which comprises temporarily applying a similar fault thereto during each of a plurality of positive half-cycles of said voltage, temporarily applying a similar fault thereto during each of a plurality of negative half-cycles of said voltage, each of said faults being applied at the same time relative to the half-cycle during which it is applied, and recording an electrical characteristic of said system during said fault applications.

6. In an electrical testing system, an electrical calculating board including means for providing a miniature electrical circuit, a source of alternating voltage for energizing a miniature electrical circuit provided on said calculating board, means for applying temporary circuit modifications to a circuit provided on said calculating board at a similar point on each of a plurality of half-cycles of said alternating voltage, said half-cycles including alternate negative and positive half-cycles, and means for indicating the effect of said modifications on an electrical quantity present in the associated miniature electrical circuit, said indicating means including means for superimposing the indications corresponding to said positive half-cycles, and for separately superimposing the indications corresponding to said negative half-cycles.

7. In an electrical testing system, an electrical calculating board including means for providing a miniature electrical circuit, a source of alternating voltage for energizing a miniature electrical circuit provided on said calculating board, means for applying temporary faults to a circuit provided on said calculating board at a similar point on each of a plurality of half-cycles of said alternating voltage, and means for indicating the effect of said faults on an electrical quantity present in the associated miniature electrical circuit, said indicating means including means for superimposing the indications corresponding to said half-cycles.

8. The method for determining the characteristics of an electrical system energized from a source of alternating voltage which comprises constructing a miniature replica of said electrical system having similar electrical characteristics, energizing said replica from a source of alternating voltage, temporarily applying a first fault to said replica at a similar point on each of a plurality of positive half-cycles of said alternating voltage, temporarily applying a second fault to said replica at a similar point on each of a plurality of negative half-cycles of said alternating voltage, said first faults being applied in alternation with said second faults, superimposing indications of an electrical quantity in said replica in synchronism with applications of said first faults, and superimposing indications of said electrical quantity in synchronism with applications of said second faults.

9. The method for determining the characteristics of an electrical system energized from a source of alternating voltage which comprises constructing a miniature replica of said electrical system having similar electrical characteristics, energizing said replica from a source of alternating voltage, temporarily applying a fault to said replica at a similar point on each of a plurality of half-cycles of said alternating voltage, removing each fault in advance of a zero point in said alternating voltage, and superimposing indications of an electrical quantity in said replica in synchronism with applications of said faults.

10. The method for determining the characteristics of an electrical system energized from a source of alternating voltage which comprises constructing a miniature replica of said electrical system having similar electrical characteristics, energizing said replica from a source of alternating voltage, temporarily applying a fault to said replica at a similar point on each of a plurality of half-cycles of said alternating voltage, and superimposing indications of an electrical quantity in said replica in synchronism with applications of said faults.

11. The method for determining the characteristics of an electrical system energized from a source of alternating voltage which comprises constructing a miniature replica of said electrical system having similar electrical characteristics, energizing said replica from a source of alternating voltage, temporarily applying a fault having an impedance which increases with a decrease in current therethrough to said replica at a similar point on each of a plurality of half-cycles of said alternating voltage, and superimposing indications of an electrical quantity in said replica in synchronism with applications of said faults.

12. The method for determining the characteristics of an electrical system energized from a source of alternating voltage which comprises constructing a miniature replica of said electrical system having similar electrical characteristics, energizing said replica from a source of alternating voltage, operatively connecting electrical discharge tube means to said miniature replica for producing by its discharge a fault on said replica, establishing a temporary conductive condition in said electrical discharge tube means at a similar point on each of a plurality of half-cycles of said alternating voltage, and superimposing indications of an electrical quantity in said replica in synchronism with establishment of said conductive condition.

13. The method for determining the characteristics of an electrical system energized from a source of alternating voltage which comprises constructing a miniature replica of said electrical system having similar electrical characteristics, energizing said replica from a source of alternating voltage, operatively connecting electrical discharge tube means to said miniature replica for producing by its discharge a fault on said replica, establishing a temporary conductive condition in said electrical discharge tube means at a similar point on each of a plurality of positive half-cycles of said alternating voltage, establishing a second temporary conductive condition of said electrical discharge tube means at a similar point on each of a plurality of negative half-cycles of said alternating voltage, said first and second temporary conductive conditions being established in alternation, superimposing indications of an electrical quantity in said replica in synchronism with establishment of said first temporary conductive condition, and separately superimposing indications of said electrical quantity in synchronism with establishment of said second temporary conductive condition.

14. In an electrical testing device for determining a characteristic of an electrical system under fault conditions, an electrical calculating board including means for providing a miniature electrical circuit having electrical characteristics similar to those of an electrical system to be studied, an impedance unit having an impedance value which decreases with increase in current therethrough, means for intermittently connecting said impedance unit to a miniature electrical circuit provided on said board at equal intervals for producing intermittent faults therein, and means for superimposing indications of an electrical quantity in the associated miniature electrical circuit in synchronism with said intermittent connection of said impedance unit.

15. In an electrical calculating system, an electrical calculating board, an impedance associated with said calculating board having an impedance value which varies inversely with current, a circuit interrupting device for periodically completing and opening an electrical circuit, means for connecting said circuit interrupting device and said impedance to a board circuit set up on said calculating board to form a resultant circuit with said interrupting device arranged for periodically disconnecting said impedance from a portion of said resultant circuit and reconnecting said impedance thereto at predetermined intervals, and means for showing an electrical characteristic of said resultant circuit, said last-named means including means for producing in synchronism with said intervals a measurable quantity controlled by said electrical characteristic.

16. In a device for analyzing the effects of electrical disturbances in an electrical circuit, means for energizing said electrical circuit with alternating energy, means for producing artificial disturbances in said electrical circuit, said means comprising gaseous discharge means for establishing a conductive path between a pair of points on said electrical circuit, said gaseous discharge means including a first unilaterally conductive unit, a second unilaterally conductive unit, said units being reversely connected for passing electrical current in both directions between said points, and control means for intermittently rendering said gaseous discharge means conductive and non-conductive at periodic intervals, and measuring means including means operating in synchronism with said periodic intervals for visually representing an electrical quantity in said circuit.

17. In a device for analyzing the effects of electrical disturbances in an electrical circuit, means for energizing said electrical circuit with alternating energy, means for producing artificial disturbances in said electrical circuit, said means comprising gaseous discharge means for establishing a conductive path between a pair of points on said electrical circuit, said gaseous discharge means including a first unilaterally conductive unit, a second unilaterally conductive unit, said units being reversely connected for passing electrical current in both directions between said points, each of said units comprising an anode and a cathode, grid control means for controlling the discharge between the anode and cathode of each of said units, means for intermittently varying the bias on said grid control means to render said units conductive and non-conductive at predetermined intervals, and measuring means for measuring an electrical quantity in said electrical circuit, said measuring means including means operating in synchronism with said periodic intervals for superimposing representations of said electrical quantity.

ROBERT D. EVANS.
ALEXANDER C. MONTEITH.